April 13, 1965   J. VERCAUTEREN   3,177,751
EDGE ALIGNING APPARATUS

Filed Aug. 6, 1962   6 Sheets-Sheet 1

INVENTOR.
Joseph Vercauteren
BY
*Irving Seidman*
ATTORNEY

April 13, 1965 J. VERCAUTEREN 3,177,751
EDGE ALIGNING APPARATUS
Filed Aug. 6, 1962 6 Sheets-Sheet 3

INVENTOR.
Joseph Vercauteren
BY
ATTORNEY

April 13, 1965   J. VERCAUTEREN   3,177,751
EDGE ALIGNING APPARATUS

Filed Aug. 6, 1962   6 Sheets-Sheet 4

INVENTOR.
Joseph Vercauteren
BY Irving Seidman
ATTORNEY

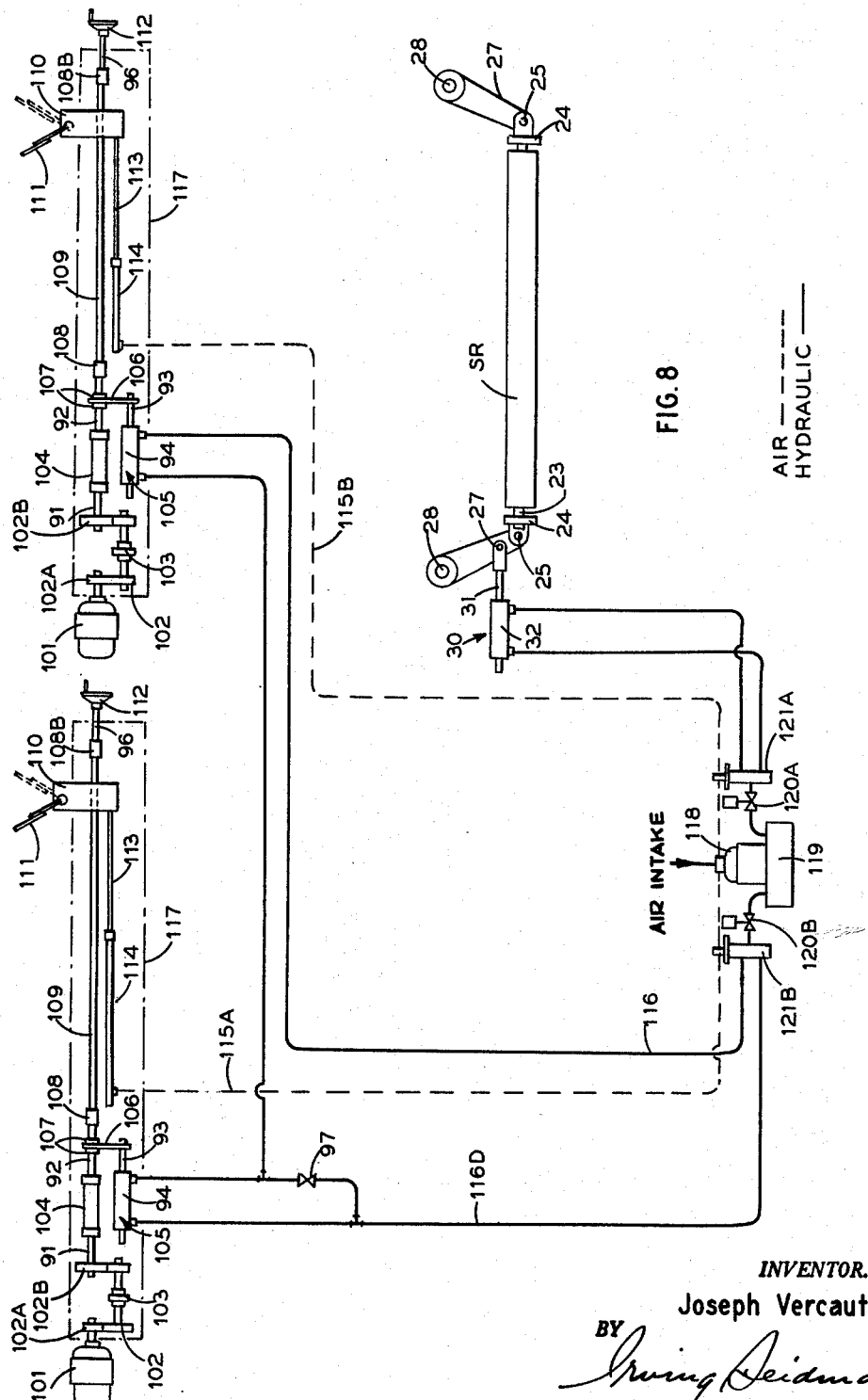

3,177,751
EDGE ALIGNING APPARATUS
Joseph Vercauteren, New Milford, N.J., assignor to Corrugating Technicians, Inc., Hillsdale, N.J., a corporation
Filed Aug. 6, 1962, Ser. No. 214,914
12 Claims. (Cl. 83—364)

This invention relates to the manufacture of corrugated board and, more particularly, to improved novel edge position controlling arrangements for maintaining accurate edge alignment of the several webs or mediums used in forming corrugated board, as they are combined to form the board.

The present invention is directed to a corrugated board forming operation of the general type shown in Densen U.S. Patent No. 2,941,572, issued June 21, 1960. This patent discloses means for maintaining proper alignment between "control" edges of the corrugated medium and a first liner, and, in the event that a "double face" corrugated board is to be made, further means for maintaining alignment of the second liner with the combined first liner and medium, or "single face" board.

In application Serial No. 75,861, filed December 14, 1960 by Robert A. Sherman and Lawrence H. Roberts, there is shown and described edge alignment maintaining means, for use in a corrugating process, in which deviation of the edge of a medium or a liner from a predetermined position is sensed by a feeler or the like which controls the effective area of a control aperture of a vacuum device so as to vary the effect of the vacuum in accordance with the deviation of the control edge from a predetermined position. In turn, the variation in the vacuum effects selective operation of a vacuum operated pilot valve controlling the application of hydraulic fluid, under pressure, to hydraulic actuators connected to mechanism for laterally shifting the controlled medium or liner to restore the predetermined control edge position.

A feature of the arrangement shown in such application is the provision of a solidly filled hydraulic fluid line interconnecting two actuators, one associated with a liner and the other associated with the medium so that the two actuators are, in effect, locked together for conjoint opration so that, in the event there is a lateral shift in the liner, for example, the medium is correspondingly shifted to maintain proper alignment between the control edges of the first liner and the medium, and vice versa. The said application further discloses a manually operated adjusting means whereby the position of a sensing head, laterally of the controlled liner or medium, can be accurately pre-set with respect to a calibrated or scaled shaft or rod. One of these adjusting arrangements is provided for each of the liners and for the medium, so that all of the edge sensing mechanisms can be pre-set at a desired value for proper maintenance of alignment between the control edges thereof. With the arrangement of the mentioned application, it is possible to maintain edge alignment within about 0.25 inch.

The importance of such edge alignment will be clear when it is considered that, in the manufacture of corrugated paperboard, a first sheet, known as the "medium" is fed from a supply roll between two heated metal rolls having fluted surfaces which corrugate the medium. While the medium is maintained in contact with one of the corrugating rolls, it is glued to a second flat sheet called the "first liner," the gluing being performed under high heat and great pressure by means of a smooth surface roll pressing the first liner against the corrugated medium engaged with such one corrugating roll. The resulting product, at this stage, is known as a sheet of "single face" corrugated paperboard.

To make a "double face" corrugated paperboard, a sheet of paper called the "second liner" is glued to the opposite face of the medium by applying glue to a surface of the single face corrugated medium and then passing the combined single face and second liner over one or more highly heated metal plates against which the two liners and the medium are pressed by a series of "weight" rollers. The duration of the pressure heat application is varied in accordance with the weight (thickness) of the paper sheets, and is regulated by varying the rate of movement of the sheets over the hot plates.

The corrugated board is purposely made oversize in width to allow subsequent edge trimming to provide smooth even edges, as the board emerging from the machine, and before trimming, does not have such smooth even edges. The trimmed board may then be slit to narrower widths, if desired, and cut into desired lengths.

If at least one edge, hereinafter called the "control edge," of each sheet can be kept in perfect alignment with the "control edges" of the other sheets during the gluing operations, the resulting corrugated paperboard emerging from the final gluing and heating operation will have at least one smooth even edge so that, at the most, only the other edge will have to be trimmed. This cuts down the percentage of scrap and also substantially reduces the slight crushing of the board attendant upon the trimming step. This tendency of the cutting or trimming operations to break down the corrugations gives the board a weakened appearance.

Another reason for the continuous monitoring of the sheet edges is important, is that the various papers have different amounts of shrinkage when subjected to high temperatures and pressures. It is not possible to determine this shrinkage in advance, so that, even with papers having exactly the same width initially, misalignment of edges may occur, due to variable shrinkage, when the paper is subjected to the high temperatures and pressures, of the order of 280° F. to 350° F., used in the gluing step during combining of the sheets into corrugated board.

In accordance with the present invention, an edge alignment controlling arrangement is provided whereby the control of the position of the "control edges" of the several sheets may be kept to a tolerance of 0.001 inch. To this end, a feature of the invention is the provision of novel edge sensing means in which a much more accurate control of the effective area of an air pressure line outlet to atmosphere is possible, resulting in a much more accurate control of the operation of the air pressure operated pilot valves controlling the supply of hydraulic fluid under pressure to the actuators for laterally shifting the liners or medium. A primary object of the invention is to provide such a more accurate edge sensing means using air pressure operated control means in place of vacuum operated means to avoid the numerous disadvantages of vacuum operated means.

A further object of the invention is to provide novel electric motor driven means operable to pre-position the sensing heads automatically with respect to different widths of webs or medium. This electric motor powered pre-positioning mechanism is so associated with the hydraulic actuated mechanism that the hydraulic mechanism may be locked in the "off" position during pre-adjustment of the edges sensing means by the operation of its electric motor, and the hydraulic mechanism may then be "unlocked" to take over automatic control of the position of the liner or web laterally during the formation of the board. To this end, the electric motor is coupled to the adjusting mechanism through a releasable electric clutch which is de-energized whenever the motor is de-energized to effectively uncouple the electric motor from the adjusting mechanism to leave the adjusting mechanism free for movement under the control of this associated hydraulic actuator means.

Yet another object of the invention is to provide a manual adjusting means conjointly associated with the electric power adjusting means, and which may be operated alternatively with the electric power adjusting means.

These and other objects and novel features of the invention will be apparent from the following description of a typical embodiment of the invention as illustrated in the accompanying drawings. In the drawings:

FIG. 8 is a schematic plan view of the edge position controller used in making single face corrugated board;

Figure 1:
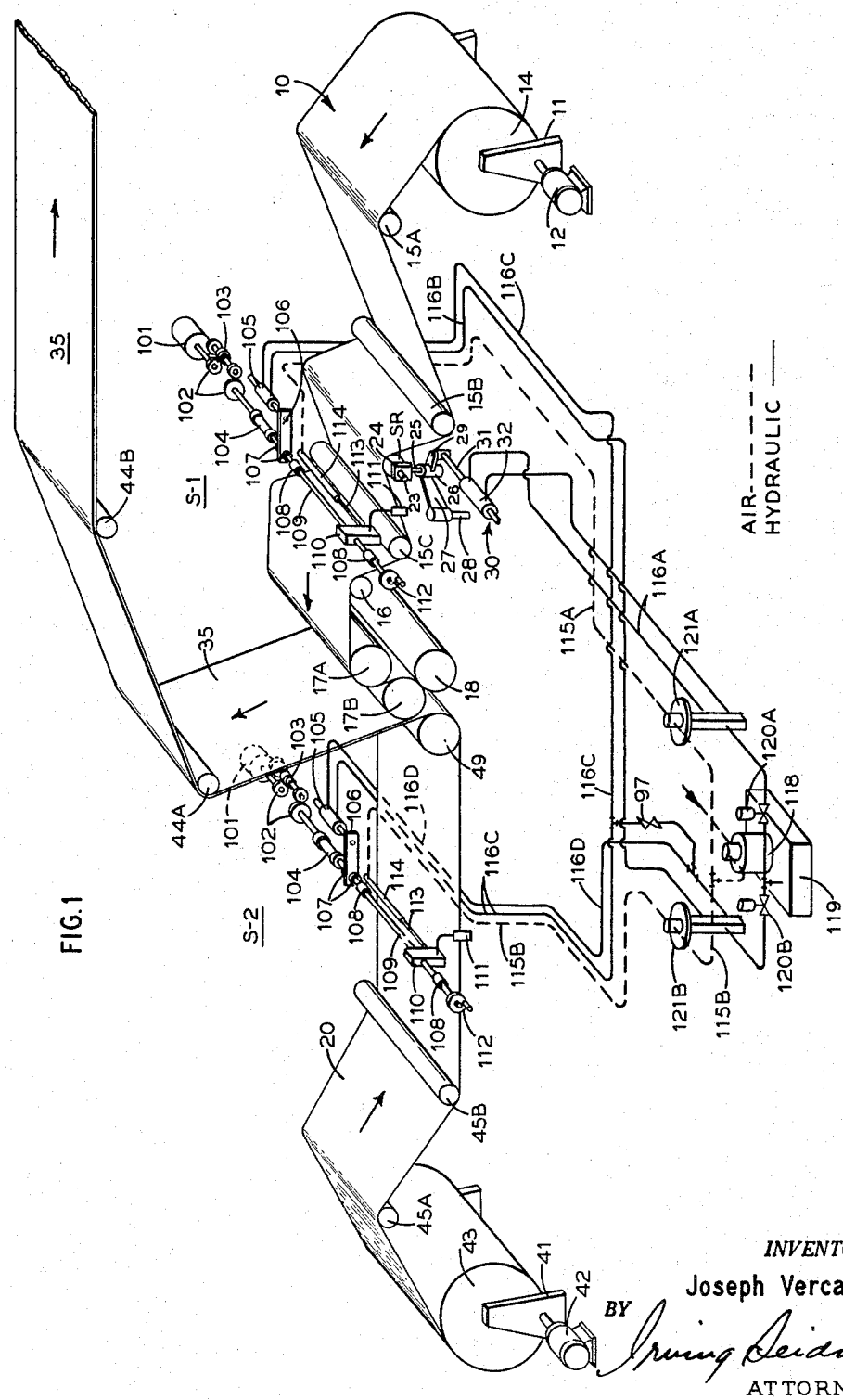
FIG. 1 is a somewhat schematic perspective view illustrating the control arrangement of the invention as applied to the uniting of a first liner and a medium to form a "single faced" corrugated board.

In the drawing, air lines are illustrated by broken or dash lines, and hydraulic lines are illustrated by solid lines.

Referring to FIG. 1, a first web 10, known as the "medium" and designed to be corrugated, is drawn from a supply roll 14 mounted in a roll stand 11 arranged to be shifted laterally by means driven by a reversible motor 12 which may be controlled by adjustably positioned microswitches (not shown) operatively associated with the lateral edges of web 10, so as to shift roll 14 laterally so that web 10 follows a predetermined path as set by the adjustably mounted microswitches.

Web 10 passes over idler roll 15A and under idler roll 15B which conjointly maintain web 10 firmly engaged with steering roll SR. Referring to FIGS. 1 and 8, steering roll SR has an axle 23 mounted in bearing blocks 24. The left hand bearing block 24, as best seen in FIG. 8, is on a vertical axis or shaft 25 which is engaged in a trunnion or bearing 26 on the outer end of a radius arm 27 pivotal about the axis of a shaft 28. The bearing block 24 at the right hand end of the steering roll SR, as viewed in FIG. 8, is similarly mounted.

The left hand trunnion or bearing 26 has a radial arm 29 extending therefrom which is pivotally engaged with the movable piston rod 31 of a hydraulic actuator 30 having a cylinder 32. The operation of this mechanism under the control of the hydraulic actuator 30 will be described more fully hereinafter.

After passing over steering roll SR, web 10 passes under a third idler roll 15C and then over a heating roll 16. From heating roll 16, the web 10 passes around a first corrugating roll 17A and then around a second corrugating roll 17B, the web 10 passing between corrugated roll 17B and a glue applying roller 18. The heating roll 16 heats the web 10 to a relatively high temperature, such as from 280° F. to 350° F., while, at the same time, imparting a high pressure thereto.

Simultaneously with the withdrawing of the web 10 from the roll 14, a second paper web 20, known as the "first liner," is drawn from a roll 43 adjustable laterally or axially by means powered by a reversible electric motor 42 controlled by adjustably positionable microswitches (not shown), operatively associated with the edges of first liner 20 to maintain this web aligned along a predetermined path as it is withdrawn from roll 43. Web 20 passes over idler roll 45A, under idler roll 45B and around pressure roll 49. Pressure roll 49 presses the first liner 20 against the glue coated surfaces of the corrugated medium 20 to form a single face web 35. Web 35 is drawn over idler rolls 44A and 44B and, if only a single face web and not a double face web is to be formed, the single face web then may be suitably trimmed and slit as described hereinafter in connection with a double face web.

Figure 2:
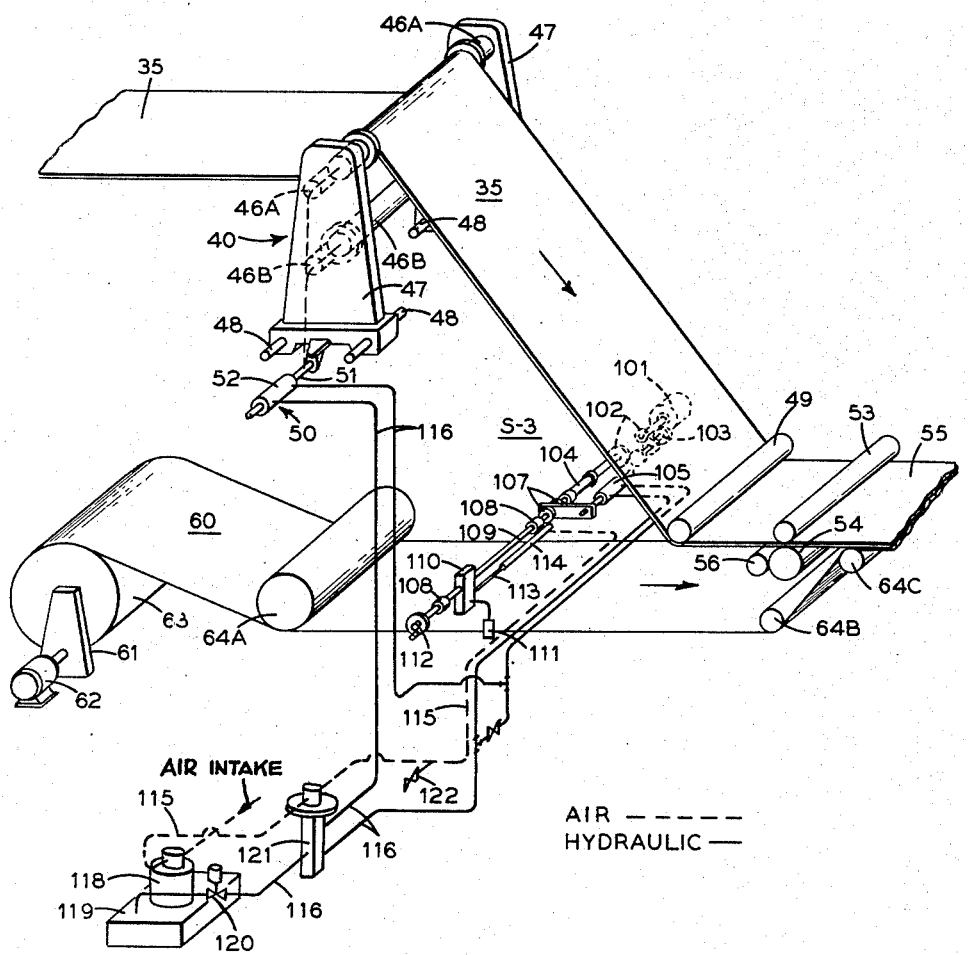
FIG. 2 is a similar view illustrating another portion of the apparatus by which a second liner may be united to the "single face" corrugated paperboard to form a "double face" corrugated paperboard.

The invention apparatus can be used either to make a single face web or to make a double face web. Referring to FIG. 2, in making a double face web, the single face web 35, after passing over the idler rolls 44A and 44B is drawn over wrap around idler rolls 46A, 46A of a single face bridge guide 40 which is bodily shiftable laterally of the web. Bridge guide 40 may be provided with a second set of wrap around idler rolls 46B, 46B. The idler rolls 46A and 46B are rotatable in a pair of uprights 47 which are slidably mounted on guide shafts or rods 48 so that bridge 40 may be shifted laterally. To this end, the left hand upright 47 is connected to the piston rod 51 of a hydraulic actuator, of the double acting type, including a cylinder 52. In a manner to be described, operation of hydraulic actuator 50 will shift the bridge 40 laterally of the single face web 35. The idler rolls 46A and 46B may be used either alternatively or conjointly.

Leaving the bridge 40, the single face web 35 passes under an idler roller 49 engaging the "first liner" surface of the single face web 35. From idler roller 49, the single face web 35 passes between a pressure roller 53 and a glue roller 54, which latter is in contact with a wiper roller 56. The glue roll 54 applies glue, delivered thereto by the wiper roller 56, to the flutes of the corrugated medium 10 forming the other surface of the single face web 35. To form the other smooth face of a double face web, a paper web 60, known as the "second liner" is drawn from a roll 63 which is mounted in upright 61 for bodily shifting laterally of the web 60 by a reversible motor 62 controlled by microswitches (not shown) operatively associated with the edges of second liner 60. The second liner 60 is then drawn under idler rolls 64A and 64B, and over an idler roll 64C which presses the second liner 60 against the glue coated flutes of the corrugated medium 10 forming one surface of the single face web 35.

Instead of shifting the entire bridge 40 laterally, the means 52 can be used to shift only the rolls 46A and 46B axially, thereby reducing the mass to be moved with consequent reduction in inertia to be overcome. This alternative is schematically illustrated by the broken line connections.

Figure 3:
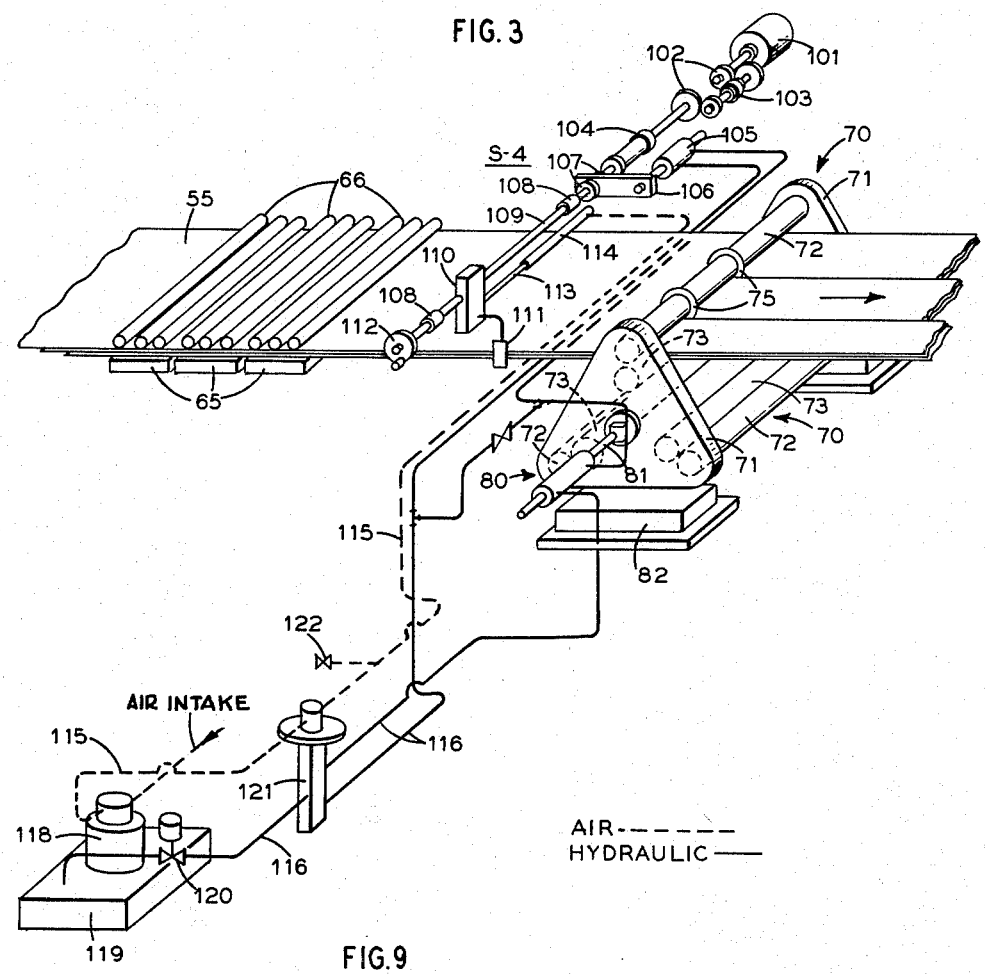
FIG. 3 is a perspective view of a novel slitter arrangement, together with the pressure means, in advance of the slitter, for uniting the second liner to the "single face" corrugated board.

Referring to FIG. 3, the three webs 10, 20 and 60 are then drawn over heated plates 65 against which the double face web 55 is pressed, to assure adherence between web 60 and medium 10, by means of weighted rollers 66.

Leaving the heated plate 65 and the weighted pressure roller 66, the double face web 55 then passes through a slitter 70. Slitter 70 comprises a pair of essentially triangular plates 71 which are angularly adjustable about their centers. These plates support three calibrated graduated shafts 72, extending across the web, one shaft being substantially at each corner of the triangles. Associated with each rotatable shaft 72 is an idler roller 73 for maintaining the double face web 55 in firm contact with the slitter rollers 72. Each roller 72 carries knives 75 which are adjustable axially of the associated roller, as by having their hubs provided with set screws. Only one shaft 72 is in operative relation with the web at any time, so that the knives may be set and adjusted on the other shaft 72 for a change in cutting width or slitting pattern. In the arrangement shown in FIG. 3, only two knives 75 are provided, but it will be understood that only one knife may be provided, or more than two knives may be provided.

The slitter 70 is suitably mounted for shifting laterally of the double face web 55, as by being mounted on rollers or the like, and such shifting is effected by a hydraulic actuator, which is double acting, and has a piston 81 connected to the slitter 70 and operable in a cylinder 82.

Figure 4:
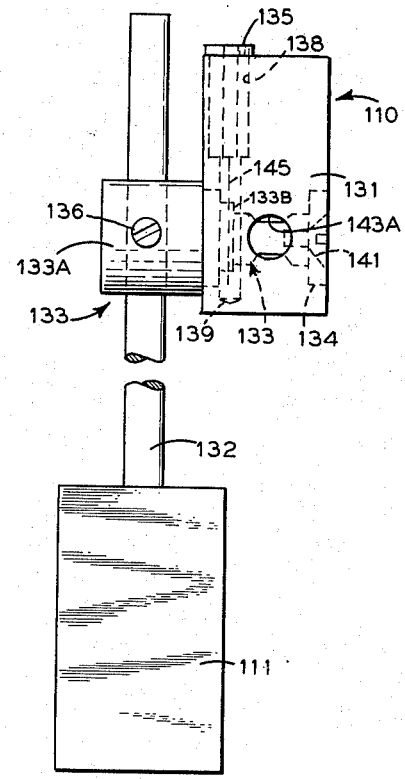
FIG. 4 is an end elevation of a novel sensing unit in accordance with the invention.

As stated, if the corresponding edges of the three webs 10, 20 and 60 are not accurately aligned, material must be trimmed from both edges of double face web 35 to form smooth even edges on the corrugated board. This not only wastes material but may also result in slight crushing and weakening of the medium 10, as illustrated in FIG. 4 of the Denson et al. patent 2,941,572. The weakened appearance of the crushed board materially detracts from its sales appeal.

There are various causes for misalignment of the edges of the webs, even though mechanism is properly adjusted in advance of starting the corrugating operation. Such causes may include mechanical play in the various elements over which the several webs travel, as well as shrinkage, which is indeterminate, in the paper itself due to the heat and pressure applied thereto.

To maintain corresponding edges of the three webs, hereinafter referred to as the "control" or "near" edges of the three webs, in accurate alignment, the apparatus incorporates edge control mechanism S which are essentially identical in construction and operation. One of the edge control mechanisms, designated S-1, controls the steering roller SR engaged with the medium 10. A second mechanism S-2, associated with the first liner web 20, controls lateral positioning of this liner web and its operation is coordinated with that of the mechanism S-1 to maintain coordinated alignment of the medium 10 and the first liner 20. A third mechanism S-3 controls lateral shifting of bridge 40 to maintain a predetermined coordinated lateral alignment of the single face web 35 and the second liner 60. In addition, a fourth edge control mechanism S-4 is used to control lateral shifting of the triple slitter 70 in accordance with any lateral shifting of the double face web 35. As all of the edge control mechanisms are identical in construction, although their inter-relation may vary, the same reference numerals have been used to designate the same parts of each edge control mechanism.

Referring to FIGS. 1 and 4 through 8, the mechanisms S-1 and S-2 and their interrelation are illustrated. Referring more particularly to FIG. 8, the mechanism S-1, which is identical with each of the mechanisms S-2, S-3 and S-4, includes an electric motor 101 which, through reduction gearing 102A, an electric clutch 103 energized and deenergized with motor 101, and reduction gearing 102B, drives a stub shaft 91 forming part of a slip yoke coupling 104. The output or driven shaft 92 of coupling 104 has collars 107 fixed thereto in axially spaced relation to receive therebetween an end of a yoke or connecting member 106. The other end of connecting member 106 is fixed to the piston 93 of a double acting hydraulic actuator 105 having a cylinder 94.

A shaft coupling 108 secures the end of shaft 92 to a threaded shaft 109 which is threadedly engaged in a sensing head 110. Sensing head 110 includes a sensing "finger" 111 which is arranged to "feel" the control edge of the medium 10. The outer end of the threaded shaft 109 is secured by a shaft coupling 108B to a shaft 96 having a manual operating hnadle 112. An air line or tube 113 is movable with the head 110 and has a fluid-tight sliding telescoping engagement with an air line or tube 114. The mechanism S-1 is enclosed within a housing schematically indicated at 117.

Referring more particularly to FIGS. 4 through 7, each sensing head 110 includes a housing 131 which may be, for example, an aluminum block. Sensing finger 111 is welded, brazed or otherwise secured to a rod 132 extending through a diametric bore in a cylindrical head 133A of a shaft member generally indicated at 133, rod 132 being secured in head 133A by means of a set screw 136 which permits longitudinal adjustment of the rod 132. The other end of shaft 133 has secured thereto a spur gear 134 which meshes with a spur gear 137, the gear ratio being preferably 1:3 to provide for adequate sensitivity. A lock screw 141 maintains the gears 134 and 137 in position.

Shaft 133 fits in a correspondingly shaped bore in the housing block 131. This bore is located at the intersection of two axially aligned drilled passages 143A and 143B. At its inner end, the passage 143B is reduced and threaded to receive a screw 144 formed with a rectangular slot which extends along a diameter thereof and in the common plane of the axis of gears 134 and 137. Passage 143A opens to atmosphere.

Gear 137 is integral with a shaft 132 formed with a rectangular slot extending diametrically thereof, as indicated at 146. Slot 146 is arranged to register to a greater or lesser extent with the rectangular slot in screw 144, depending upon the angular position of gear 137. In turn, this angular position of gear 137 is controlled by the "finger" 111 through the gear 134.

In the normally vertical position of the finger 111, there is a predetermined degree of registry of the slot 146 with the slot in screw 144. Swinging of the finger 111 to either side of this predetermined position will result in an increase or a decrease in the degree of registry of the slot 146 with the slot in screw 144, due to the angular adjustment of the gear 137 by virtue of its meshing with the gear 134. Correspondingly, this will either increase or decrease the effective air pressure in the passage 143B which is connected in communicating relation with the movable air tube 113.

Figure 5:
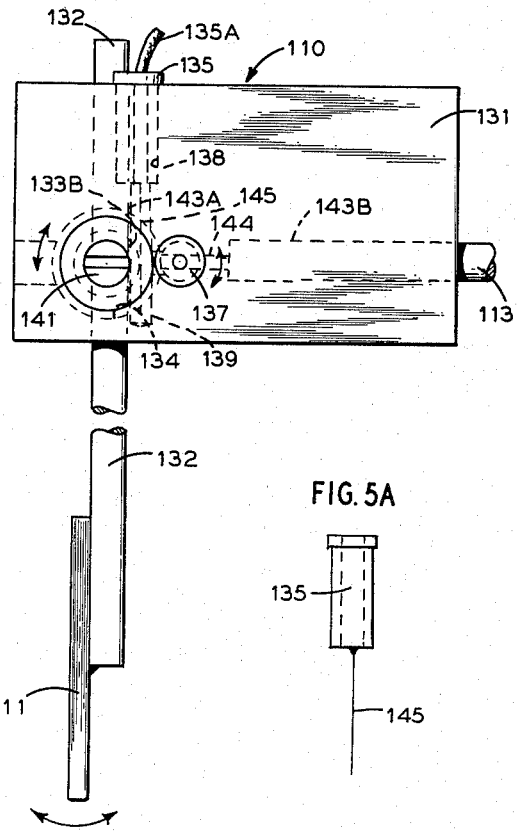
FIG. 5 is a side elevation view of the sensing unit.
Figure 5A:
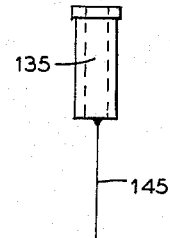
FIG. 5A is an elevation view of an element of FIG. 5.
Figure 6:
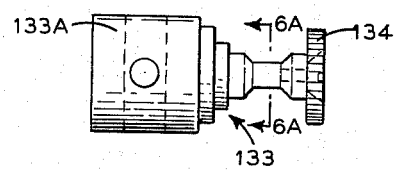
FIG. 6 is an elevation view of an important internal part of the sensing mechanism.
Figure 7:
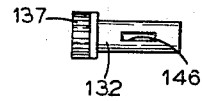
FIG. 7 is a side elevation view of another important part of the sensing mechanism.
Figure 6A:
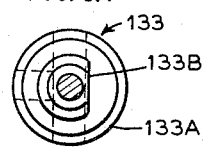
FIG. 6A is a sectional view of FIG. 6.

As best seen in FIG. 6A, shaft 133 is formed with a flat 133B. A threaded passage 138 is drilled in block 131 and has a reduced diameter extension 139 intersecting the passage receiving shaft 133. Passage 138 receives an insulated "banana" jack 135 (FIG. 5A) having a piano wire 145 soldered to its inner end and extending into passage extension 139. Wire 145 extends in parallel closely spaced relation to flat 133B so that it is contacted by either end of the flat upon slight rotation of shaft 133 in either direction. A wire 135A is connected to the outer end of jack 135 for a purpose to be described.

The fixed section 114 of the air line is connected by an air line 115A to an air pressure operated pilot valve 121A, and to a double acting air compressor 118 driven conjointly with a hydraulic fluid pump connected to a hydraulic fluid reservoir 119. The double acting air compressor is so designed, that, if one side loses pressure by operation of a finger 111, the other side will retain pressure to thereby eliminate "hunting" of the web controlled by the particular finger 111. With the pump 118 connected to one side of the operating mechanism of the pilot valve 121A, the position of the pilot valve is controlled by the degree of registry between the slot 146 and the slot in screw 144 which, in turn, controls the effective connection to the atmosphere of the movable section 113 of the air line.

The pilot valve 121A is connected, through a solenoid operating blocking valve 120A, to the hydraulic fluid reservoir 119. Valve 121A selectively controls the application of hydraulic pressure to opposite sides of the double acting actuator 30 connected to the steering roller SR. Consequently, this steering roller will be shifted in position in accordance with any movement of the control finger 111 engaging the medium 10. As the control action takes place, involving the shifting of the steering roll SR, the medium 10 is shifted laterally so that the finger 111 is moved back toward its neutral position wherein the air pressure effective on the valve 121A is such that both lines 116A are at equal pressure and then the movement of steering roll SR stops.

There is an interconnection between the operation of the sensing device controlling the medium 10 and the sensing device controlling the first liner 20. Thus, the fixed section 114 of the air line of the sensing device S–2 is connected through a line 115B to an air pressure operated pilot valve 121B and through this valve 121B to the other side of the air compressor 118. The position of the valve 121B, which controls the hydraulic pressure applied thereby, is thereby made dependent upon the position of the sensing finger 111 engaged with the first liner 20. Valve 121B is connected to the hydraulic pressure reservoir 119 through a solenoid operated valve 120B. A hydraulic fluid line 116B connects the valve 121B to the inner or right side of the hydraulic actuator 105 controlling the position of the sensing finger 111 of the sensing device S–1. Another hydraulic line 116C connects the outer or left end of the hydraulic actuator 105 of the sensing device S–1 to the inner or right hand side of the hydraulic actuator 105 controlling the position of the sensing device S–2. The outer or left hand side of this latter hydraulic actuator is connected by a hydraulic fluid line 116D to the pilot valve 121B. An automatic reloader valve 97 for the fluid line 116D is connected between the lines 116C and 116D. By virtue of the hydraulic fluid filled line 116C, there is a "solid" connection between the actuators 105 of the sensing units S–1 and S–2, so that these two actuators always operate in synchronism with each other. This is the equivalent of a rigid mechanical link, but without the disadvantages of a link, such as loosened adjustment, temperature variations of length, and so forth.

Figure 9:
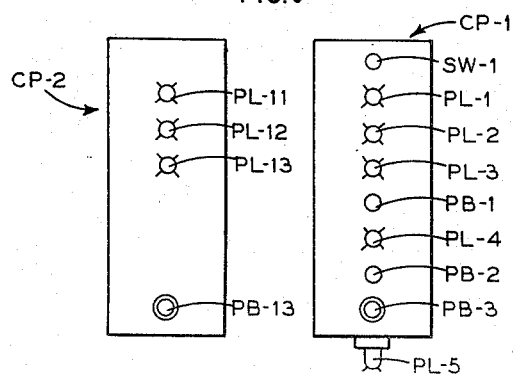
FIG. 9 is an elevation view illustrating the operating panels at the control station for the controller of FIG. 8.

FIG. 9 illustrates the control station for the single facing operation, and this station includes two control panels CP–1 and CP–2. Control panel CP–1 is for the sensing unit S–1 for the medium 10, and control panel CP–2 is for the sensing unit S–2 for the first liner 20. On the main control panel CP–1, there is a toggle switch SW–1 which controls power to the controller, as by energizing the air compressor and the hydraulic fluid pump. Immediately below this switch, there is a pilot lamp PL–1 which indicates when the power is furnished to the controller. Two other pilot lamps PL–2 and PL–3 serve to indicate the limits of movement of the roll stand 11. Immediately below the pilot lamp PL–3 there is a pushbutton PB–1 which, when depressed, operates the solenoid valve 120A to the closed or blocking position and, as a result of operation of this valve, a pilot lamp PL–4 is lit. The solenoid valve 120A may be released by a pushbutton PB–2, the circuit connections being of a conventional nature and not illustrated in the drawings.

A pushbutton PB–3 is provided, which, in a conventional manner, may energize the motor 101 for initial adjustment of the sensing head 110 laterally of the web 10. An indicator lamp PL–5 at the bottom of the control panel CP–1 is lit when the power unit is on.

The control panel CP–2 is generally similar to the control panel CP–1, but includes only the indicator lamp PL–11 for indicating that power is supplied to the controller, and the indicator lamps PL–12 and PL–13 for indicating the limits of operation of the roll stand 41. In addition, there is a pushbutton PB–3 which controls the operation of the motor 101 of the sensing unit S–2 for initial adjustment of the sensing head 110 of this latter unit.

In the operation of the invention arrangement as thus far described, the sensing heads 110 of the two units S–1 and S–2 are adjusted to an initial preselected position either by operation of motor 101 which, when energized, also results in energization of the clutch 103, or else by operation of the manual handle 12 with the motor 101 and the clutch 113 de-energized, so that the clutch 113 is disengaged.

The jack 135 and wire 145 are included in the energizing circuit for motor 101, and it will be noted that housing block 131, and thus shaft 133, are grounded. Wire 145 is insulated from block 131 by jack 135. This wire is included in a 24-volt circuit for a latching relay (not shown) which, when transferred, de-energizes motor 101.

When its control push button is operated, motor 101 rotates shaft 109 to shift head 110. Sensing finger 111 is plumb and shaft 133 has an angular position in which flat 133B is vertical and in closely spaced parallel relation to wire 145. Operation of motor 110 continues until finger 111 contacts an edge of its associated web. This causes finger 111 to swing in one direction or the other, rotating shaft 133. Almost immediately, an end of flat 133B will engage wire 145 to ground the latter. The latching relay is transferred and motor 101 is thus automatically cutout so that the automatic edge sensing control "takes over."

During such initial adjustment, the push buttons PB–3 and PB–13 are operated to close the solenoid valves 120 to lock the hydraulic system out of operation. Thus the adjustment may be effected with the piston 93, fork 106, collars 107, and shaft 92 locked against longitudinal movement, although the shaft 92 is still rotatable.

After the initial adjustment has thus been effected for both the medium 10 and the first liner 20, the fingers 111 of the sensing units S–1 and S–2 are in the neutral position. Assuming that the first liner 20 shifts laterally, for any reason, such as, for example, shrinkage of the first liner, the finger 111 of the sensing unit S–2 will be shifted in one direction or the other from its neutral position and thus will either increase or decrease the air pressure effective upon the pilot valve 121B. In turn, and through the hydraulic output lines connected thereto, this will effect a conjoint operation of the actuators 105 of the two sensing units so that the respective sensing heads are shifted in the direction such that the finger 111 of the sensing head 110 of the sensing unit S–2 will be moved back to neutral. At the same time, and due to the operation of the actuator 105 associated with the sensing unit S–1, the finger 111 engaged with the control edge of the medium 10 will also be shifted from neutral, and this will vary the air pressure effective upon the pilot valve 121A. In turn, this will effect hydraulic operation of the actuator 30 to shift the steering roller SR in a direction such as to restore the finger 111 engaged with the control edge of the medium 10 to the neutral position. Consequently, responsive to any shift laterally of the first liner 20, the medium 10 will be correspondingly shifted by operation of the steering roll SR so that exact alignment is always maintained, within a tolerance of 0.001 inch, between the control edges of the medium 10 and the first liner 20.

The mechanisms 30, 50, 80 and 105, while referred to as hydraulic cylinder and piston actuators, may be hydraulic motors. In such case, the hydraulic controls may be by-passed by 4-way valves and these hydraulic motors used to "run in" and "run out" the sensing heads, thus dispensing with the electric motors 101.

The operation of the sensing unit S–3 controlling the position of the second liner 60 is exactly the same as that of either of the sensing units S–1 and S–2. However, in this case there is no conjoint operation. With the hydraulic system locked out of control, the position of the sensing head 110 is adjusted either electrically by operation of motor 101 manually by operation of handle 112, or mechanically by elements 80 and 105 if these are hydraulic motors, so that the finger 111 of the sensing unit S–3 is in the neutral position at a position exactly corresponding to the position of the initially set control edges of the medium 10 and the first liner 20. Any shifting of the second liner 60 from its initially set position, will result in movement of the finger 111 of this sensing unit to control, through the valve 121, the application of fluid pressure to hydraulic actuator 50 for the bridge 40. As the bridge 40 is shifted, the actuator 105 will correspondingly be shifted to shift the second liner 60 until such time as the finger 111 of the sensing unit S–3 is back in its neutral position, at which time the control edge of the single face medium 35 will be exactly aligned with the control edge of the double face web 60.

Figure 10:
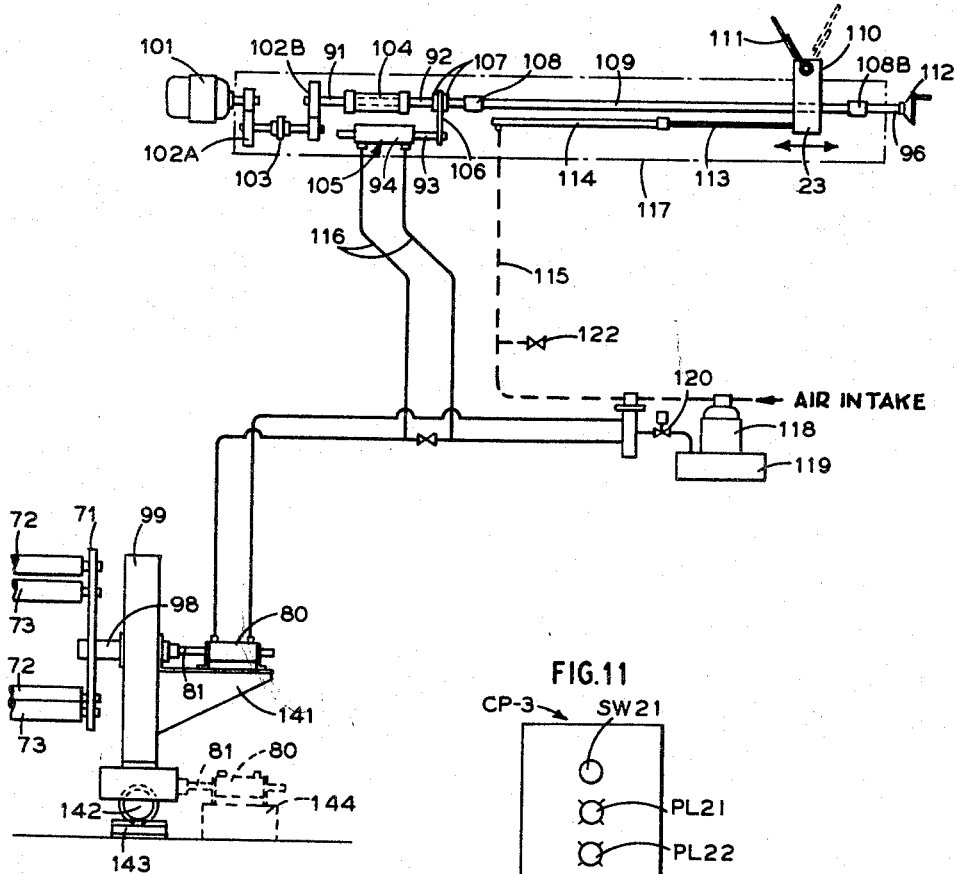
FIG. 10 is a somewhat schematic plan and part elevation view illustrating the edge position controller at the slitter.
Figure 11:
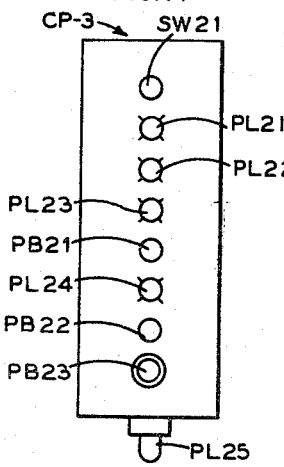
FIG. 11 is an elevation view of the control panel at the control station for the controller of FIG. 10.

Referring to FIGS. 10 and 11, lateral shifting of the slitter 70 in accordance with any lateral shifting of the double face corrugated board 55 is controlled by the sensing unit S–4. This sensing unit, which is identical with the other sensing units, has a control panel CP–3 which is identical with the control panel CP–1 and has the same indicator lamps, switches, and push buttons thereon. Initial adjustment of the position of the sensing unit S–4 for the slitter 70 is effected in the same manner as described, either by operation of a motor 101 or by operation of the manual handle 112. Should the double face corrugated board shift laterally, the movement of the control edge thereof will operate the finger 111 in one direction or the other to, in turn, actuate the pilot valve 121 in one direction or the other. The actuator 80 for the slitter 70 is interconnected with the actuator 105 for adjusting the sensing head 110 in the same manner as previously described.

Thus the two actuators are conjointly operated so that, when the slitter reaches a position which is properly aligned with the shifted position of the double face web 55, the control finger 111 will be back in the neutral position and operation of the actuators will cease.

As best illustrated in FIG. 10, the actuator 80 may be aligned axially with the bearing 98 about which the frame 71 of the slitter may be shifted with reference to a support 99. In this case, the actuator 80 may be mounted upon a bracket 141 secured to the support 99 and may shift the bearing 98 axially. Alternatively, the frame supports 99 may be mounted upon wheels 142 on rails 143 extending transversely of the line of operation. In this case, the actuator 80 is mounted on a support 144 and its rod 81 is connected to the base of the supports 99.

As stated, the edge aligning mechanism provides a control of alignment of the control edges of either two webs or the three webs to a tolerance of 0.001 inch as compared with the tolerance of 0.25 inch possible with previous edge aligning mechanisms. Part of this sensitivity of control is due to the particular construction of the sensing head 110 with the reduction gear ratio between the gears 134 and 137 controlling the effective air pressure. It should be noted that the sensing head fingers 111 are sufficiently heavy so that they will always tend to seek a vertical or plumb position, which is the neutral position, no matter in which direction they are displaced from such neutral position.

As will be appreciated by those skilled in the art, air pressure operation has numerous advantages as compared to vacuum operation. In addition to dust-free operation, lack of condensation, and continuous cooling of the diaphragm valves, another advantage is better control, of the order of 100 times better. This is largely due to the fact that air pressure operation is not sensitive with respect to atmospheric pressure and temperature variations, both of which seriously affect vacuum operation.

While a specific embodiment of the invention has been shown and described in detail to illustrate the application of the principles of the invention, it will be understood that the invention may be embodied otherwise without departing from such principles.

What is claimed is:

1. In apparatus for uniting paper webs in superposed relation to form multi-ply paper strip, edge aligning means operable to maintain a control edge of a traveling web in a predetermined position laterally of the path of travel of the web, said apparatus comprising, in combination, a support extending transversely of the web; a threaded shaft rotatably mounted on said support and extending longitudinally thereof; a sensing head threadedly engaged with said shaft for adjustment laterally of the web; a sensing finger extending from said head to engage such control edge, and having a neutral position when said control edge is in said predetermined lateral position; electric motor means on said support selectively operable to rotate said shaft to adjust said head; switch means associated with said head and connected to said electric motor means and operable by movement of said sensing finger from its neutral position to prevent energization of said electric motor means to provide accurate initial positioning of said sensing finger; an axially adjustable coupling between said motor means and said shaft; a hydraulic actuator on said support having its piston connected to said shaft to shift the latter bodily in an axial direction; a source of hydraulic fluid under pressure; a valve controlling application of said fluid to opposite sides of said piston for selective operation of said actuator in opposite directions; means operatably interconnecting said sensing finger of said sensing head and said valve whereby, upon movement of said sensing finger from its neutral position responsive to lateral shifting of said web, said valve will control application of fluid to said piston for selective operation of said actuator in a direction to shift said shaft and said sensing head bodily to restore said finger to said neutral position.

2. In apparatus for uniting paper webs in superposed relation to form multi-ply paper strip, edge aligning means operable to maintain control edges of a pair of first and second traveling webs in a predetermined position laterally of the path of travel of the respective webs, said apparatus comprising, in combination, first and second sensing units, each associated with the respective one of said webs, and each comprising a support extending transversely of the associated web, a threaded shaft rotatably mounted on the support and extending longitudinally thereof, a sensing head threadedly engaged with each shaft for adjustment laterally of the associated web, a sensing finger extending from each head to engage the control edge of the respective web and having a neutral position when the respective control edge is in its predetermined lateral position, electric motor means on each support selectively operable to rotate the associated shaft to adjust the associated head, an axially adjustable coupling between each motor means and its associated shaft, and a hydraulic actuator on each support having its piston connected to the associated shaft to shift the latter bodily in an axial direction; a source of hydraulic fluid under pressure; a hydraulic fluid line interconnecting one end of one actuator and the opposite end of the other actuator, and solidly filled with hydraulic fluid; a first valve connected to said source, to the opposite end of said one hydraulic actuator and to the one end of said other hydraulic actuator, for selective conjoint operation of said actuators in opposing directions; a third hydraulic actuator operatably connected to said first web to shift the same laterally of its path of travel; a second valve controlling application of fluid to opposite ends of said third hydraulic actuator for selective operation thereof in opposing directions; means operatably interconnecting the sensing head associated with said second web and said first valve whereby, upon movement of the sensing finger engaged with the control edge of the second web from a neutral position, due to shifting of the second web laterally of its path of travel, said first valve is operated to control application of fluid to opposite ends of said first two hydraulic actuators to bodily shift the shaft of the sensing unit associated with said second web in a direction to restore the sensing finger thereof to its neutral position, and to bodily shift the shaft of the sensing unit associated with the first web in a direction to move the associated sensing finger from its neutral position; and means operatively interconnecting the sensing head of the sensing unit associated with the first web and said second valve to control application of fluid to said third hydraulic actuator for selective operation thereof to shift the first web in a direction to restore its associated sensing finger to the neutral position.

3. In apparatus for uniting paper webs, as claimed in claim 2, the shaft of the sensing unit associated with said second web being shifted in the same direction as the first web is shifted.

4. In apparatus for uniting paper webs in superposed relation to form multi-ply paper strip, as claimed in claim 1, a shut-off valve connected between said source and said first mentioned valve; and means selectively operable to close said shut-off valve during operation of said electric motor means.

5. In apparatus for uniting paper webs in superposed relation, as claimed in claim 1, said coupling connecting said motor means to one end of said shaft; and a manual operator on the opposite end of said shaft for manually rotating the same to adjust said sensing head.

6. In apparatus for uniting paper webs in superposed relation, as claimed in claim 1, said valve being an air pressure actuated pilot valve; a source of pressure air connected to said valve; an air line connecting said valve to said sensing head; said sensing head having openings to atmosphere in communication with said air line; and means forming an adjustable aperture between said air line and said opening, and operable by said sensing finger to vary the effective connection of said air line to atmosphere in accordance with the position of said sensing finger.

7. In apparatus for uniting paper webs in superposed relation, as claimed in claim 6, in which said sensing finger is pivotally suspended from said sensing head; said variable aperture means comprising a rotatable valve in said head controlling communication between said air line and said atmosphere openings; said rotatable valve being rotated by oscillation of said sensing finger.

8. In apparatus for uniting paper webs in superposed relation, as claimed in claim 7, said sensing finger being secured to a shaft rotatably mounted in said sensing head; a relatively large diameter gear carried by said shaft; and a relatively small diameter gear connected to said rotatable valve and meshing with said relatively large diameter gear.

9. In apparatus for uniting paper webs in superposed relation, as claimed in claim 8, said rotatable valve having a stem formed with a diametrically extending slot therethrough and said stem extending across a passage in said head; and a slotted screw threaded in said passage and having a diametrically extending aperture therethrough registerable with the aperture through said stem.

10. In apparatus for uniting paper webs in superposed relation to form multi-ply paper strip, edge aligning means operable to maintain control edges of a pair of traveling first and second webs in a predetermined position laterally of the path of travel of the webs, said apparatus comprising, in combination, a support extending transversely of the second web; a threaded shaft rotatably mounted on said support and extending longitudinally thereof; a sensing head threadedly engaged with said shaft for adjustment laterally of the second web; a sensing finger extending from said head to engage the control edge of said second web and having a neutral position when the control edge of said second web is in said predetermined lateral position; electric motor means on said support selectively operable to rotate said shaft to adjust said head; an axially adjustable coupling between said motor means and said shaft; a first hydraulic actuator on said support having its piston connected to said shaft to shift the latter bodily in an axial direction; a second hydraulic actuator operatively connected to said first web to shift the same laterally of its path of travel; a source of hydraulic fluid under pressure; a hydraulic fluid line connecting one end of said first hydraulic actuator to the corresponding end of said second hydraulic actuator, and solidly filled with hydraulic fluid; a valve connected to said source, to the opposite end of said first actuator, and to the opposite end of said second actuator; and means operatively interconnecting said head and said valve whereby, upon movement of said sensing finger from a neutral position due to shifting of said second web, said valve will be operated to control application of fluid to said hydraulic actuators for selective operation of said hydraulic actuators in opposite directions to shift said first web laterally and to shift said shaft bodily in a direction to restore said sensing finger to its neutral position.

11. An apparatus for uniting paper webs in superposed relation to form multi-ply strip, edge aligning means operable to maintain a control edge of a traveling web in a predetermined position laterally of the path of travel of the web, said apparatus comprising, in combination, a support extending transversely of the web; a threaded shaft rotatably mounted on said support and extending longitudinally thereof; a sensing head threadedly engaged with said shaft for adjustment laterally of the web; a sensing finger extending from said head to engage such control edge and having a neutral position when such control edge is in said predetermined lateral position; electric motor means on said support selectively operable to rotate said shaft to adjust said head; switch means associated with said head and connected to said electric motor means and operable by movement of said sensing finger from its neutral position to prevent energization of said electric motor means to provide accurate initial positioning of said sensing finger; an axially adjustable coupling between said motor means and said shaft; a first hydraulic actuator on said support having its piston connected to said shaft to shift the latter bodily in an axial direction; a source of hydraulic fluid under pressure; a slitter operatively engageable with said web to slit the same into predetermined widths; a second hydraulic actuator operable to adjust said slitter laterally of the path of travel of said web; a hydraulic fluid line interconnecting corresponding ends of said first and second hydraulic actuators, and solidly filled with hydraulic fluid; a valve connected to said source of hydraulic fluid, to the opposite end of said first actuator, and to the opposite end of said second actuator; means operatively interconnecting said head and said valve whereby, upon movement of said sensing finger from a neutral position due to shifting of said web, said valve will control application of fluid to said hydraulic actuators for selective operation thereof in opposite directions to shift said slitter laterally of the path of travel of said web and to bodily shift said shaft in a direction to restore said sensing finger to its neutral position; said shaft and said slitter being shifted in opposed lateral directions.

12. Edge sensing apparatus, for sensing the lateral position of the edge of a web, comprising, in combination, a sensing head; a sensing finger pivotally suspended from said head to engage a web-edge and gravity constrained to a plumb position; a rotatable valve in said head rotatable by oscillation of said finger, said valve controlling communication between an air pressure line and atmosphere; air pressure controlled web position adjusting means operatively connected to said air pressure line; an electric motor selectively operable to bodily "run in" and "run out" said head relative to its controlled web; an energizing circuit for said motor; and means, including a switch in said head operable by said valve upon movement of said finger from its plumb position, to deactivate said energizing circuit.

References Cited by the Examiner
UNITED STATES PATENTS

| | | | |
|---|---|---|---|
| 2,735,630 | 2/56 | Ziebolz | 226—19 |
| 3,008,864 | 11/61 | Macklem et al. | 83—368 |
| 3,036,483 | 5/62 | Porter | 83—74 |

ANDREW R. JUHASZ, *Primary Examiner.*

HUNTER C. BOURNE, Jr., *Examiner.*